United States Patent
Gupta et al.

(10) Patent No.: US 12,483,877 B2
(45) Date of Patent: Nov. 25, 2025

(54) METHOD AND APPARATUS FOR COMMUNICATION SYSTEM SERVING VEHICLES

(71) Applicant: NOKIA TECHNOLOGIES OY, Espoo (FI)

(72) Inventors: Pallab Gupta, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 556 days.

(21) Appl. No.: 17/963,574

(22) Filed: Oct. 11, 2022

(65) Prior Publication Data

US 2023/0116601 A1 Apr. 13, 2023

(30) Foreign Application Priority Data

Oct. 11, 2021 (IN) .............................. 202111046140

(51) Int. Cl.
  *H04W 8/20* (2009.01)
  *H04W 4/029* (2018.01)
  *H04W 12/06* (2021.01)
  *H04W 84/06* (2009.01)

(52) U.S. Cl.
  CPC ............. *H04W 8/20* (2013.01); *H04W 4/029* (2018.02); *H04W 12/06* (2013.01); *H04W 84/06* (2013.01)

(58) Field of Classification Search
  CPC ....... H04W 8/20; H04W 4/029; H04W 12/06; H04W 84/06; H04W 12/69; H04W 12/08; H04L 63/105; H04L 67/12
  See application file for complete search history.

(56) References Cited

U.S. PATENT DOCUMENTS

| | | | |
|---|---|---|---|
| 11,943,689 B2 * | 3/2024 | Xu | H04W 48/18 |
| 12,089,038 B2 * | 9/2024 | Moon | G08G 5/55 |
| 2021/0076202 A1 * | 3/2021 | Park | H04W 76/11 |
| 2022/0386147 A1 * | 12/2022 | Majjiga | G08G 5/22 |

OTHER PUBLICATIONS

3GPP TS 23.273 V17.2.0 (Sep. 2021), Technical Specification, 3rd Generation Partnership Project; Technical Specification Group Services and System Aspects; 5G System (5GS) Location Services (LCS); Stage 2 (Release 17), Sep. 2021.

* cited by examiner

*Primary Examiner* — Brandon J Miller
(74) *Attorney, Agent, or Firm* — Nokia Technologies Oy (57) ABSTRACT

A technique comprising: based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

19 Claims, 4 Drawing Sheets

METHOD AND APPARATUS FOR COMMUNICATION SYSTEM SERVING VEHICLES

CROSS REFERENCE TO RELATED APPLICATION

This application claims the benefit of Indian Application No. 202111046140, filed Oct. 11, 2021. The entire content of the above-referenced application is hereby incorporated by reference.

TECHNICAL FIELD

The present disclosure relates to apparatus, a method, and a computer program, and in particular to apparatus, methods and computer programs for a communication system serving vehicles.

BACKGROUND

The operation of vehicles (such as e.g. unmanned aerial vehicles) may involve vehicle authorisation by a traffic management entity. Vehicles may comprise user equipment functionality for a mobile communications system.

SUMMARY

A method comprising: based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

Requesting subscription to the data analytics service may comprise sending to a service function providing the data analytics service a subscription request indicating an identifier for the user equipment.

The subscription request may further include location information for the user equipment.

The location information may comprise latitude, longitude and altitude for the user equipment.

The method may comprise: in response to receiving one or more notifications of one or more events indicating travel of the user equipment, directing to the traffic management entity a notification of travel of the user equipment.

The vehicle may be an aerial vehicle.

The one or more events indicating travel of the user equipment may be one or more events indicating flight of the vehicle.

A method comprising: based on at least (i) one or more indications that a user equipment registered to a mobile communication system is associated with a vehicle, and (ii) absence of one or more conditions for sending a request to a traffic management entity for authorisation of the vehicle: directing to the traffic management entity one or more notifications of registration of the user equipment to the mobile communication system.

The one or more notifications to the traffic management entity may indicate an identifier for the user equipment.

The one or more notifications to the vehicle management entity may also indicate an identifier for the vehicle.

The vehicle may be an aerial vehicle.

A method comprising: based on at least a failure to authorise a vehicle associated with a user equipment registered to a mobile communication system, subscribing to a data analytics service of the mobile communication system for one or more notifications about one or more events indicating travel of the user equipment Subscribing to the data analytics service may be done via a network exposure function of the mobile communication system.

A method comprising: in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment: subscribing to a data analytics service of the mobile communication system for one or more notifications about one or more events indicating travel of the user equipment.

Subscribing to the data analytics service may be done via a network exposure function of the mobile communication system.

The vehicle may be an aerial vehicle, and the one or more notifications about one or more events indicating travel of the user equipment may comprise one or more notifications indicating flight of the user equipment.

A method comprising: receiving a request from a consumer function for one or more notifications of one or more events indicating travel of a user equipment registered to a mobile communication system; analyzing data relating to operation of the user equipment in the mobile communication system from one or more functions of the mobile communication system; and in response to determining that the data indicates travel of the user equipment, directing one or more event notifications to the consumer function.

The data relating to operation of the user equipment in the mobile communication system may comprise one or more of the following: flight path reporting data provided by the user equipment; data indicating a current location of the user equipment from an access management function of the mobile communication system; periodic data about location of the user equipment from a gateway mobile location centre of the mobile communication system; subscription parameters for the user equipment from a data management entity; notifications from a radio access network of the mobile communication system indicating crossing of a threshold height by the user equipment.

The consumer function may comprise an access management function for the user equipment, a session management function for the user equipment, or a network function at a network exposure function of the mobile communication system.

Apparatus comprising: means for, based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

The means for requesting subscription to the data analytics service may comprise means for sending to a service function providing the data analytics service a subscription request indicating an identifier for the user equipment.

The subscription request may further include location information for the user equipment.

The location information may comprise latitude, longitude and altitude for the user equipment.

The apparatus may comprise: means for, in response to receiving one or more notifications of one or more events indicating travel of the user equipment, directing to the traffic management entity a notification of travel of the user equipment.

The vehicle may be an aerial vehicle.

The one or more events indicating travel of the user equipment may be one or more events indicating flight of the vehicle.

Apparatus comprising: means for, based on at least (i) one or more indications that a user equipment registered to a mobile communication system is associated with a vehicle, and (ii) absence of one or more conditions for sending a request to a traffic management entity for authorisation of the vehicle, directing to the traffic management entity one or more notifications of registration of the user equipment to the mobile communication system.

The one or more notifications to the traffic management entity may indicate an identifier for the user equipment.

The one or more notifications to the vehicle management entity may also indicate an identifier for the vehicle.

The vehicle may be an aerial vehicle.

Apparatus comprising: means for, based on at least a failure to authorise a vehicle associated with a user equipment registered to a mobile communication system, subscribing to a data analytics service of the mobile communication system for one or more notifications about one or more events indicating travel of the user equipment The means for subscribing to the data analytics service may comprise means for subscribing via a network exposure function of the mobile communication system.

Apparatus comprising: means for, in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment, subscribing to a data analytics service of the mobile communication system for one or more notifications about one or more events indicating travel of the user equipment.

The means for subscribing to the data analytics service may comprise means for subscribing via a network exposure function of the mobile communication system.

The vehicle may be an aerial vehicle, and the one or more notifications about one or more events indicating travel of the user equipment may comprise one or more notifications indicating flight of the user equipment.

Apparatus comprising: means for receiving a request from a consumer function for one or more notifications of one or more events indicating travel of a user equipment registered to a mobile communication system; means for analyzing data relating to operation of the user equipment in the mobile communication system from one or more functions of the mobile communication system; and means for, in response to determining that the data indicates travel of the user equipment, directing one or more event notifications to the consumer function.

The data relating to operation of the user equipment in the mobile communication system may comprise one or more of the following: flight path reporting data provided by the user equipment; data indicating a current location of the user equipment from an access management function of the mobile communication system; periodic data about location of the user equipment from a gateway mobile location centre of the mobile communication system; subscription parameters for the user equipment from a data management entity; notifications from a radio access network of the mobile communication system indicating crossing of a threshold height by the user equipment.

The consumer function may comprise an access management function for the user equipment, a session management function for the user equipment, or a network function at a network exposure function of the mobile communication system.

Apparatus comprising: at least one processor; and at least one memory including computer program code, the at least one memory and computer program code configured to, with the at least one processor, cause the apparatus to perform: based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

Requesting subscription to the data analytics service may comprise sending to a service function providing the data analytics service a subscription request indicating an identifier for the user equipment.

The subscription request may further include location information for the user equipment.

The location information may comprise latitude, longitude and altitude for the user equipment.

The at least one memory and computer program code may be configured to, with the at least one processor, cause the apparatus to: in response to receiving one or more notifications of one or more events indicating travel of the user equipment, directing to the traffic management entity a notification of travel of the user equipment.

The vehicle may be an aerial vehicle.

The one or more events indicating travel of the user equipment may be one or more events indicating flight of the vehicle.

Apparatus comprising: at least one processor; and at least one memory including computer program code, the at least one memory and computer program code configured to, with the at least one processor, cause the apparatus to perform: based on at least (i) one or more indications that a user equipment registered to a mobile communication system is associated with a vehicle, and (ii) absence of one or more conditions for sending a request to a traffic management entity for authorisation of the vehicle: directing to the traffic management entity one or more notifications of registration of the user equipment to the mobile communication system.

The one or more notifications to the traffic management entity may indicate an identifier for the user equipment.

The one or more notifications to the vehicle management entity may also indicate an identifier for the vehicle.

The vehicle may be an aerial vehicle.

Apparatus comprising: at least one processor; and at least one memory including computer program code, the at least one memory and computer program code configured to, with the at least one processor, cause the apparatus to perform: based on at least a failure to authorise a vehicle associated with a user equipment registered to a mobile communication system, subscribing to a data analytics service of the mobile communication system for one or more notifications about one or more events indicating travel of the user equipment.

Subscribing to the data analytics service may be done via a network exposure function of the mobile communication system.

Apparatus comprising: at least one processor; and at least one memory including computer program code, the at least one memory and computer program code configured to, with the at least one processor, cause the apparatus to perform: in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment: subscribing to a data analytics service of the mobile communication system for one or more notifications about one or more events indicating travel of the user equipment.

Subscribing to the data analytics service may be done via a network exposure function of the mobile communication system.

The vehicle may be an aerial vehicle, and the one or more notifications about one or more events indicating travel of the user equipment may comprise one or more notifications indicating flight of the user equipment.

Apparatus comprising: at least one processor; and at least one memory including computer program code, the at least one memory and computer program code configured to, with the at least one processor, cause the apparatus to perform: receiving a request from a consumer function for one or more notifications of one or more events indicating travel of a user equipment registered to a mobile communication system; analyzing data relating to operation of the user equipment in the mobile communication system from one or more functions of the mobile communication system; and in response to determining that the data indicates travel of the user equipment, directing one or more event notifications to the consumer function.

The data relating to operation of the user equipment in the mobile communication system may comprise one or more of the following: flight path reporting data provided by the user equipment; data indicating a current location of the user equipment from an access management function of the mobile communication system; periodic data about location of the user equipment from a gateway mobile location centre of the mobile communication system; subscription parameters for the user equipment from a data management entity; notifications from a radio access network of the mobile communication system indicating crossing of a threshold height by the user equipment.

The consumer function may comprise an access management function for the user equipment, a session management function for the user equipment, or a network function at a network exposure function of the mobile communication system.

Apparatus comprising: requesting circuitry for, based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

Apparatus comprising: directing circuitry for, based on at least (i) one or more indications that a user equipment registered to a mobile communication system is associated with a vehicle, and (ii) absence of one or more conditions for sending a request to a traffic management entity for authorisation of the vehicle, directing to the traffic management entity one or more notifications of registration of the user equipment to the mobile communication system.

Apparatus comprising: subscribing circuitry for, based on at least a failure to authorise a vehicle associated with a user equipment registered to a mobile communication system, subscribing to a data analytics service of the mobile communication system for one or more notifications about one or more events indicating travel of the user equipment Apparatus comprising: subscribing circuitry for, in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment, subscribing to a data analytics service of the mobile communication system for one or more notifications about one or more events indicating travel of the user equipment.

Apparatus comprising: receiving circuitry for receiving a request from a consumer function for one or more notifications of one or more events indicating travel of a user equipment registered to a mobile communication system; analyzing circuitry for analyzing data relating to operation of the user equipment in the mobile communication system from one or more functions of the mobile communication system; and directing circuitry for, in response to determining that the data indicates travel of the user equipment, directing one or more event notifications to the consumer function.

A computer readable medium comprising program instructions stored thereon for performing: based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

A computer readable medium comprising program instructions stored thereon for performing: based on at least (i) one or more indications that a user equipment registered to a mobile communication system is associated with a vehicle, and (ii) absence of one or more conditions for sending a request to a traffic management entity for authorisation of the vehicle: directing to the traffic management entity one or more notifications of registration of the user equipment to the mobile communication system.

A computer readable medium comprising program instructions stored thereon for performing: based on at least a failure to authorise a vehicle associated with a user equipment registered to a mobile communication system, subscribing to a data analytics service of the mobile communication system for one or more notifications about one or more events indicating travel of the user equipment A computer readable medium comprising program instructions stored thereon for performing: in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment: subscribing to a data analytics service of the mobile communication system for one or more notifications about one or more events indicating travel of the user equipment.

A computer readable medium comprising program instructions stored thereon for performing: receiving a request from a consumer function for one or more notifications of one or more events indicating travel of a user equipment registered to a mobile communication system; analyzing data relating to operation of the user equipment in the mobile communication system from one or more functions of the mobile communication system; and in response to determining that the data indicates travel of the user equipment, directing one or more event notifications to the consumer function.

A non-transitory computer readable medium comprising program instructions stored thereon for performing: based on at least (i) one or more indications that a user equipment registered to a mobile communication system is associated with a vehicle and (ii) absence of an indication that the vehicle is authorised by a traffic management entity, requesting subscription to a data analytics service for notifications about one or more events indicating travel of the user equipment.

A non-transitory computer readable medium comprising program instructions stored thereon for performing: based on at least (i) one or more indications that a user equipment registered to a mobile communication system is associated with a vehicle, and (ii) absence of one or more conditions for sending a request to a traffic management entity for authorisation of the vehicle: directing to the traffic management entity one or more notifications of registration of the user equipment to the mobile communication system.

A non-transitory computer readable medium comprising program instructions stored thereon for performing: based on at least a failure to authorise a vehicle associated with a user equipment registered to a mobile communication system, subscribing to a data analytics service of the mobile communication system for one or more notifications about one or more events indicating travel of the user equipment A non-transitory computer readable medium comprising program instructions stored thereon for performing: in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment: subscribing to a data analytics service of the mobile communication system for one or more notifications about one or more events indicating travel of the user equipment.

A non-transitory computer readable medium comprising program instructions stored thereon for performing: receiving a request from a consumer function for one or more notifications of one or more events indicating travel of a user equipment registered to a mobile communication system; analyzing data relating to operation of the user equipment in the mobile communication system from one or more functions of the mobile communication system; and in response to determining that the data indicates travel of the user equipment, directing one or more event notifications to the consumer function.

A computer program comprising computer executable code which when run on at least one processor is configured to cause an apparatus at least to: based on at least (i) one or more indications that a user equipment registered to a mobile communication system is associated with a vehicle and (ii) absence of an indication that the vehicle is authorised by a traffic management entity, request subscription to a data analytics service for notifications about one or more events indicating travel of the user equipment.

A computer program comprising computer executable code which when run on at least one processor is configured to cause an apparatus at least to: based on at least (i) one or more indications that a user equipment registered to a mobile communication system is associated with a vehicle, and (ii) absence of one or more conditions for sending a request to a traffic management entity for authorisation of the vehicle, direct to the traffic management entity one or more notifications of registration of the user equipment to the mobile communication system.

A computer program comprising computer executable code which when run on at least one processor is configured to cause an apparatus at least to: based on at least a failure to authorise a vehicle associated with a user equipment registered to a mobile communication system, subscribe to a data analytics service of the mobile communication system for one or more notifications about one or more events indicating travel of the user equipment.

A computer program comprising computer executable code which when run on at least one processor is configured to cause an apparatus at least to: in response to at least (i) receiving, at a traffic management entity, notification, from a core network node of a mobile communication system, of registration of a user equipment to the mobile communication system, without (ii) receiving, at the traffic management entity, a request for authorisation of a vehicle associated with the user equipment, subscribe to a data analytics service of the mobile communication system for one or more notifications about one or more events indicating travel of the user equipment.

A computer program comprising computer executable code which when run on at least one processor is configured to cause an apparatus at least to: receive a request from a consumer function for one or more notifications of one or more events indicating travel of a user equipment registered to a mobile communication system; analyze data relating to operation of the user equipment in the mobile communication system from one or more functions of the mobile communication system; and in response to determining that the data indicates travel of the user equipment, direct one or more event notifications to the consumer function.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

The following description of example embodiments makes mention of mobile communication systems operating according to specific 3GPP protocols (3GPP 5G protocol), but the underlying technique is also applicable to mobile communication systems operating according to other protocols, such as more evolved 3GPP protocols.

Figure 1:
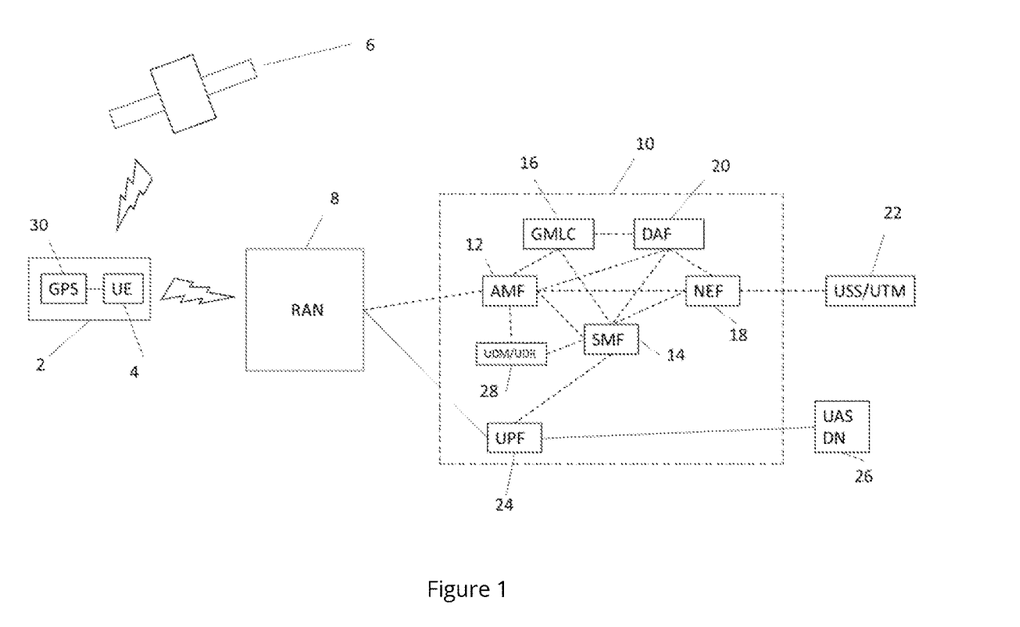
FIG. 1 illustrates an example system to which embodiments may be applied.

FIG. 1 shows a representation of an example of a system to which embodiments may be applied. For conciseness, FIG. 1 focusses on those components of the system having a primary role in the example embodiments described below, but the system may comprise other components.

The connections shown in FIG. 1 are logical connections; the actual physical connections may be different.

The radio access network 8 of FIG. 1 comprises a plurality of access nodes (such as (e/g)NodeB) operating a plurality of cells serving both aerial user equipments (e.g. user equipments in unmanned aerial vehicles (UAVs)) and non-aerial user equipments. The cells may be macro cells (or umbrella cells) which are large cells, usually having a diameter of up to tens of kilometers, or smaller cells such as micro-, femto- or picocells.

The (e/g)NodeB is a computing device configured to control radio resources of the 3GPP ($3^{rd}$ Generation Partnership Project) mobile communication system. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeBs are further connected to the core network 10 (CN or NGC (next generation core). The (e/g)NodeBs are connected to one or more user-plane entities of the core network 10 for routing and forwarding user data packets and for providing connectivity of user equipments to one or more external packet data networks, and to one or more control-plane entities of the core network for controlling access and mobility of the user equipments.

5G enables using multiple input-multiple output (MIMO) antennas. 5G enables using macro sites operating in co-operation with smaller stations and employing a variety of radio technologies depending on service needs, use cases and/or spectrum available. 5G may have multiple radio interfaces, e.g. below 6 GHz or above 24 GHz, cmWave and mmWave, and is also integrable with existing legacy radio access technologies, such as Long Term Evolution (LTE). Integration with LTE may be implemented as a system, where macro coverage is provided by the LTE and 5G radio interface access comes from small cells by aggregation to the LTE. In other words, 5G can support both inter-RAT operability (such as LTE-5G) and inter-RI operability (inter-radio interface operability, such as below 6 GHz (cmWave) or above 24 GHz (cmWave and mmWave). One of the concepts used in 5G networks is network slicing in which multiple independent and dedicated virtual sub-networks (network instances) are created within the same infrastructure to run services that have different requirements on latency, reliability, throughput and mobility.

Low latency applications and services may be facilitated in 5G by bringing the content close to the radio which leads to local break out and multi-access edge computing (MEC). 5G enables analytics and knowledge generation to occur at the source of the data.

The mobile communication system is also able to communicate with other networks, such as a public switched telephone network, or a VoIP (Voice over Internet Protocol) network, or the Internet, or a private network, or utilize services provided by them.

In these example embodiments, a 3GPP mobile communication system serves devices 2 comprising a component (UE) 4 providing user equipment functionality in the 3GPP mobile communication system also comprising a radio access network 8 and a core network 10. The devices 2 served by the 3GPP mobile communication system may include unmanned aerial vehicles (UAVs) capable of flight. The 3GPP subscription information for a UE 4 may indicate whether the UE 4 is associated with an aerial vehicle.

A UAV 2 may comprise a global positioning system (GPS) component 24 for receiving GPS signals from a system of GPS satellites 6, and determining the location of the UAV 2 based on the received GPS signals.

The UAV 2 with which a UE 4 is associated may be identified by a CAA (civil aviation authority) UAV ID.

The UAV 2 may be part of an unmanned aerial system (UAS) also comprising a UAV controller (not shown) for controlling the UAV 2. Critical communications between the UAV 2 and the UAV controller (e.g. command and control (C2)) may or may not be via the 3GPP mobile communication system.

In this example, an aerial traffic management entity 22 (USS/UTM (UAS Service Supplier/UAS Traffic Management) entity) provides services to support the safe and efficient use of airspace by providing services to the operator of a UAS in meeting operational requirements. In this example, the USS/UTM 22 is external to the 3GPP mobile communication system. In this example, the USS/UTM 22 acts as an external application function (AF) in relation to the 3GPP mobile communication system. The USS/UTM 22 can access 3GPP services via network exposure function NEF 18. A UAS network function (NF) is supported within the network exposure function (NEF) 18.

Figure 2:
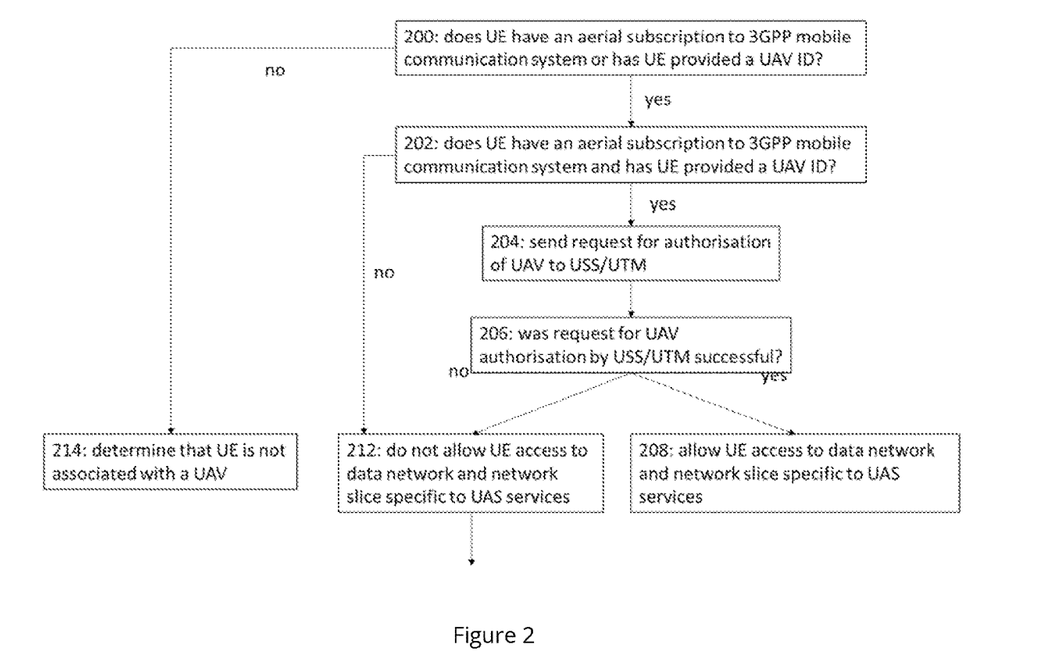
FIG. 2 shows a representation of an example of operations at a core network function according to example embodiments.

FIG. 2 shows an example of operations at an access management function (AMF) 12 having received a registration request from UE 4 or a session management function (SMF) 14 having received a PDU session request from UE 4.

The AMF 12/SMF 14 determines whether UE has a 3GPP aerial subscription or has provided a CAA-level ID (OPERATION 200). If the result of this determination is negative, AMF 12/SMF 14 determines that UE 4 is not associated with a UAV (OPERATION 212).

AMF 12/SMF 14 determines whether UE 4 has a 3GPP aerial subscription and has provided a CAA-level ID (OPERATION 202). If the result of the determination is negative (i.e. if UE 4 does not have a 3GPP aerial subscription, or UE 4 has not provided a CAA-level ID), UE 4 may not be allowed to use the 3GPP mobile communication system for unmanned aerial system (UAS) operations (OPERATION 210). For example, UE 4 may not be allowed to use the 3GPP mobile communication system for C2 communications between the UAV 2 and a remote UAV controller (not shown).

In this example, the AMF 12/SMF 14 is configured such that it does not send a request for UAV authorisation to USS/UTM 22 unless AMF 12/SMF 14 determines that UE 4 both has an aerial subscription and has provided a CAA-level UAV ID.

On the other hand, if the result of the determination at OPERATION 202 is positive, the AMF 12/SMF 14 directs to USS/UTM 22 a request for authorisation of the UAV identified by the CAA-level ID provided by UE 4 (OPERATION 204).

If the USS/UTM 22 returns an indication that UAV 2 is authorised by USS/UTM 22, UE 4 is allowed to use the 3GPP mobile communication system for unmanned aerial system (UAS) operations (OPERATION 208). For example, UE 4 is allowed to use the 3GPP mobile communication system for C2 communications between the UAV 2 and a remote UAV controller (not shown). UE 4 is allowed access via the 3GPP mobile communication system to a data network (DN) 26 specific to unmanned aerial system (UAS) services, and to a traffic management entity (USS/UTM 22). UE 4 is allowed access to a network slice of the 3GPP mobile communication system specific to UAS services.

On the other hand, if USS/UTM 22 returns an indication that the UAV 2 identified by the CAA-level UAV ID in the authorisation request is not authorised by USS/UTM 22, UE 4 may not be allowed to use the 3GPP mobile communication system for unmanned aerial system (UAS) operations (OPERATION 210). For example, UE 4 may not be allowed to use the 3GPP mobile communication system for C2 communications between the UAV 2 and a remote UAV controller (not shown). UE 4 may not be allowed access via the 3GPP mobile communication system to a data network (DN) 26 specific to unmanned aerial system (UAS) services, or to the aerial traffic management entity (USS/UTM 22). UE 4 is not allowed access to a network slice of the 3GPP mobile communication system specific to UAS services.

Figure 3:
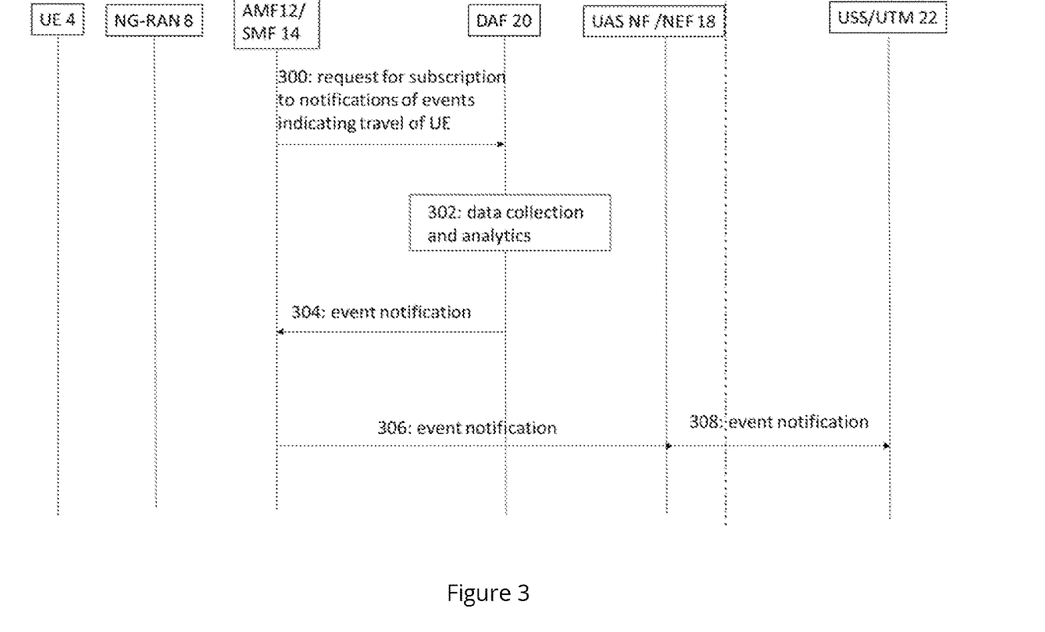
FIG. 3 shows a representation of an example of operations at components of FIG. 1 related to the operations of FIG. 2 according to example embodiments.

FIG. 3 shows an example of operations at components of FIG. 1 after OPERATION 210 of FIG. 2. In summary, AMF 12/SMF 14 has determined that UE 4 is associated with a UAV (because UE 4 has a 3GPP aerial subscription and/or because UE 4 has provided a CAA-level ID) but there is no indication at AMF 12/SMF 14 of authorisation of the UAV 2 by USS/UTM 22 (because a request for authorisation of UAV 2 was made and failed, or because AMF 12/SMF 14 did not send a request for UAV authorisation to USS/UTM 22 e.g. either because the UE did not provide CAA Level ID or because the UE does not have aerial subscription).

In this example, the AMF 12/SMF 14 has already received (not shown in FIG. 3) from UAS NF/NEF 18 2) an explicit request for subscription to events indicating travel of UEs that are determined by the AMF 12/SMF 14 to be associated with a UAV but for which there is no indication at the AMF 12/SMF 14 of UAV authorisation by USS/UTM 22. The explicit subscription request from UAS NF/NEF 18 may be based on an explicit subscription request from USS/UTM 22; or an operator policy for the 3GPP mobile communication system may dictate that UAS NF/NEF 18 sends an explicit subscription request to all AMFs and SMFs of the 3GPP mobile communication system, and that UAS NF/NEF 18 creates a subscription to forward event notifications from AMF 12/SMF 14 to USS/UTM 22. In other words, the explicit subscription request from UAS NF/NEF 18 may be sent based on operator policy, instead of in response to an explicit subscription request from USS/UTM 22. According to another example variation, an operator policy for the 3GPP mobile communication system dictates that AMF 12/SMF 14 creates a subscription to provide UAS NF 18 with such event notifications, and dictates that UAS NF/NEF 18 creates a subscription to forward the event notifications from AMF 12/SMF 14 to USS/UTM 22, The AMF 12/SMF 14 directs to a data analytics function (DAF) 20 of the 3GPP mobile communication system a request for subscription to a service providing notifications of events indicating travel of a UE (OPERATION 300). The DAF 20 may be a network data analytics function (NWDAF) at the network plane of the 3GPP mobile communication system, or may be a management data analytics function (MDAF) at the management plane of the 3GPP mobile communication system. The subscription request includes analytics id (analytics id=UE_AERIAL_STATUS) identifying the analytics for which notification is requested by AMF 12/SMF 14. The subscription request includes one or more UE IDs (such as e.g. SUPI (Subscription Permanent Identifier) or GPSI (Generic Public Subscription Identifier) as filtering information for the DAF 20. The subscription request may also include information about a current location of UE 4, if available to the AMF 12/SMF 14.

DAF 20 collects data relating to the location of the UE 4 identified in the subscription request from AMF 12/SMF 14, and performs data analytics (OPERATION 302). The data used by DAF 20 for the data analytics may comprise one or more of the following:

(a) flight path reporting data provided by UE 4 (and received by DAF 20 from RAN 8) as part of the flight path reporting mechanism first introduced by 3GPP Release 15 for the purpose of enabling the provision of early resource reservation in cells suitable for a handover of a UAV-UE, and thereby achieve a higher quality of service (QoS) for a UAV-UE;

(b) location data for UE 4 received in subscription request from AMF 12/SMF 14;

(c) location data for UE 4 from GMLC 16 (such as e.g. location data received from GMLC 16 periodically (e.g. about every 1 minute));

(d) UDM (Unified Data Management) subscription parameters;

(e) height based reports for UE 4 from RAN 8 (e.g. notifications from RAN 8 in response to detecting at RAN 8 that UE 4 has crossed a threshold height from above or below);

(f) information about the spatial conditions (terrain or relief) of the geographic area in which UE 4 is located, and pre-provisioned information about flight corridors in that geographical area.

In response to detecting from analysis of the collected data one or more indications that UE 4 is flying, DAF 20 sends an event notification to AMF 12/SMF 14 (OPERATION 304).

Based on the previous subscription request from USS/UTM 22, AMF 12/SMF 14 then sends an event notification to UAS NF/NEF 18 for forwarding onto USS/UTM 22 (OPERATION 306); and UAS NF/NEF 18 forwards the event notification onto USS/UTM 22 (OPERATION 308). The event notification comprises: an event ID identifying that the event is unauthorised UAV operation; one or more 3GPP identifiers for the UE (e.g. GPSI, PEI (permanent equipment identifier); a CAA-level UAV ID, if provided by UE 4; and information about the location of UE 4, if available to AMF 12/SMF 14. If information about the location of UE 4 is not available to AMF 12/SMF 14, or if more precise location information is available at UAS NF/NEF 18 (such as e.g. location information according to the 5G enhanced location services specified in 3GPP TS 23.273), UAS NF/NEF 18 may add location information for UE 4 when forwarding the event notification to USS/UTM 22.

Figure 4:
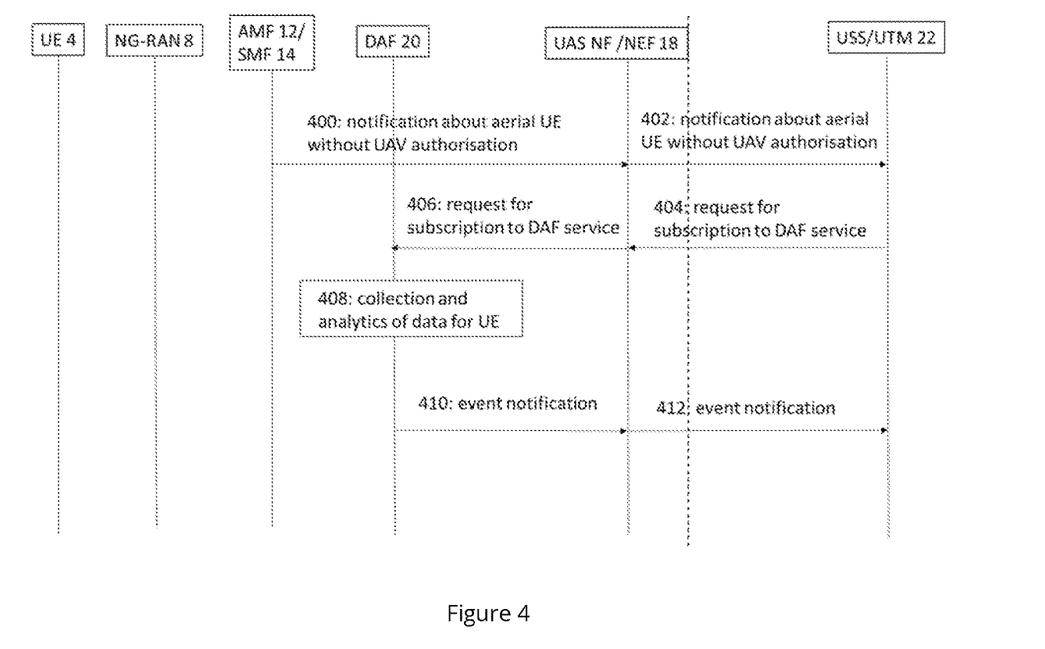
FIG. 4 shows a representation of another example of operations at components of FIG. 1 related to the operations of FIG. 2 according to example embodiments.

FIG. 4 shows another example of operations at components of FIG. 1 after OPERATION 210 of FIG. 2. In summary, AMF 12/SMF 14 has determined that UE 4 is associated with a UAV (because UE 4 has a 3GPP aerial subscription and/or because UE 4 has provided a CAA-level UAV ID) but there is no indication at AMF 12/SMF 14 of UAV authorisation by USS/UTM 22 (because a request for UAV authorisation was made and failed, or because AMF 12/SMF 14 did not send a request for UAV authorisation to USS/UTM 22 e.g. either because the UE did not provide CAA Level ID or because the UE does not have aerial subscription).

In this example, the AMF 12/SMF 14 has already received (not shown in FIG. 4) via UAS NF/NEF 18 an explicit request from USS/UTM 22 for subscription to a service providing notifications of UEs that are determined by AMF 12/SMF 14 to be associated with a UAV, but for which there is no indication at AMF 12/SMF 14 of UAV authorisation by USS/UTM 22. The explicit subscription request from UAS NF/NEF 18 may be based on an explicit subscription request from USS/UTM 22; or an operator policy for the 3GPP mobile communication system dictates that UAS NF/NEF 18 sends such an explicit subscription request to all AMFs and SMFs of the 3GPP mobile communication system, and that UAS NF/NEF 18 creates a subscription to forward such event notifications from AMF 12/SMF 14 to USS/UTM 22. In other words, the explicit subscription request may be sent from UAS NF/NEF 18 based on operator policy, instead of in response to receiving an explicit subscription request from USS/UTM 22. According to another example variation, an operator policy for the 3GPP mobile communication system dictates that AMF 12/SMF 14 creates a subscription to provide UAS NF 18 with such event notifications, and dictates that UAS NF/NEF 18 creates a subscription to forward such event notifications from AMF 12/SMF 14 to USS/UTM 22, AMF 12/SMF 14 sends to UAS NF/NEF 18 an event notification about a UE 4 that AMF 12 or SMF 14 has determined to be associated with a UAV, but for which there is no indication at AMF 12/SMF 14 of UAV authorisation by USS/UTM 22 (OPERATION 400). UAS NF/NEF 18 forwards the event notification to USS/UTM 22 (OPERATION 402). The event notification comprises: an ID identifying the event (Event ID="UE-registered-without-UAV-authorisation"); one or more 3GPP identifiers for the UE 4 (e.g. GPSI); a CAA-level UAV ID if provided by UE 4; and information about the location of UE 4 if available to AMF 12/SMF 14. If information about the location of UE 4 is not available to AMF 12/SMF 14, or if more precise location information is available at UAS NF/NEF 18 (such as e.g. location information according to the 5G enhanced location services specified in 3GPP TS 23.273), UAS NF/NEF 18 may add UE location information when forwarding the event notification to USS/UTM 22.

Based on local policy and configuration the USS/UTM 22 sends to UAS NF/NEF 18 a request for subscription to a data analytics service providing notifications of events indicating flight of UE 4 (OPERATION 404). UAS NF/NEF 18 forwards the subscription request to DAF 20 (OPERATION 406). The subscription request comprises an ID identifying the analytics event for which notification is requested (analytics-Id=UE_AERIAL_STATUS). The subscription request also comprises a 3GPP identifier for the UE (e.g. GPSI) as filtering information.

If the absence of an indication at AMF 12/SMF 14 of UAV authorisation is the result of a failure of a request for authorisation sent to USS/UTM 22, OPERATIONS 400 AND 402 may be omitted, because the authorisation request sent by AMF12/SMF14 to USS/UTM 22 would have included all the information that USS/UTM 22 needs to send the request for subscription to the data analytics service providing notifications of events indicating flight of UE 4.

DAF 20 collects data relating to the location of UE 4 identified in the subscription request from USS/UTM 22 via UAS NF/NEF 18, and performs data analytics (OPERATION 408). The data used by DAF 20 for the data analytics may comprise one or more of the following:

(a) flight path reporting data provided by UE 4 (and received by DAF 20 from RAN 8) as part of the flight path reporting mechanism first introduced by 3GPP Release 15 for the purpose of enabling the provision of early resource reservation in cells suitable for a handover of the UAV-UE, and thereby achieve a higher quality of service (QoS) for the UAV-UE;

(b) location data for UE 4 received in subscription request from AMF 12 or SMF 14;

(c) location data for UE 4 from GMLC (such as e.g. location data received from GMLC 16 periodically (e.g. about every 1 minute));

(d) UDM subscription parameters;

(e) height based reports for UE 4 from RAN 8 (e.g. notifications from RAN 8 in response to detecting at RAN 8 that UE 4 has crossed a threshold height from above or below;

(f) information about the spatial conditions (terrain or relief) of the geographic area in which UE 4 is located, and pre-provisioned information about flight corridors in that geographical area.

In response to detecting, from analysis of the collected data, an event indicating that UE 4 is flying, DAF 20 sends an event notification to UAS NF/NEF 18 (OPERATION 410) for forwarding to USS/UTM 22. UAS NF/NEF 18 forwards the event notification to USS/UTM 22 (OPERATION 412). The event notification includes an event ID identifying the event (Event Id=Unauthorised UAV operation"); and one or more 3GPP identifiers for the UE 4 (e.g. GPSI). The UAS NF/NEF 18 may forward the event notification to USS/UTM 22 together with a CAA-level UAV ID (if included in the subscription request from USS/UTM 22) and information about the current location of the UE (such as e.g. location information according to the 5G enhanced location services specified in 3GPP TS 23.273).

Figure 5:
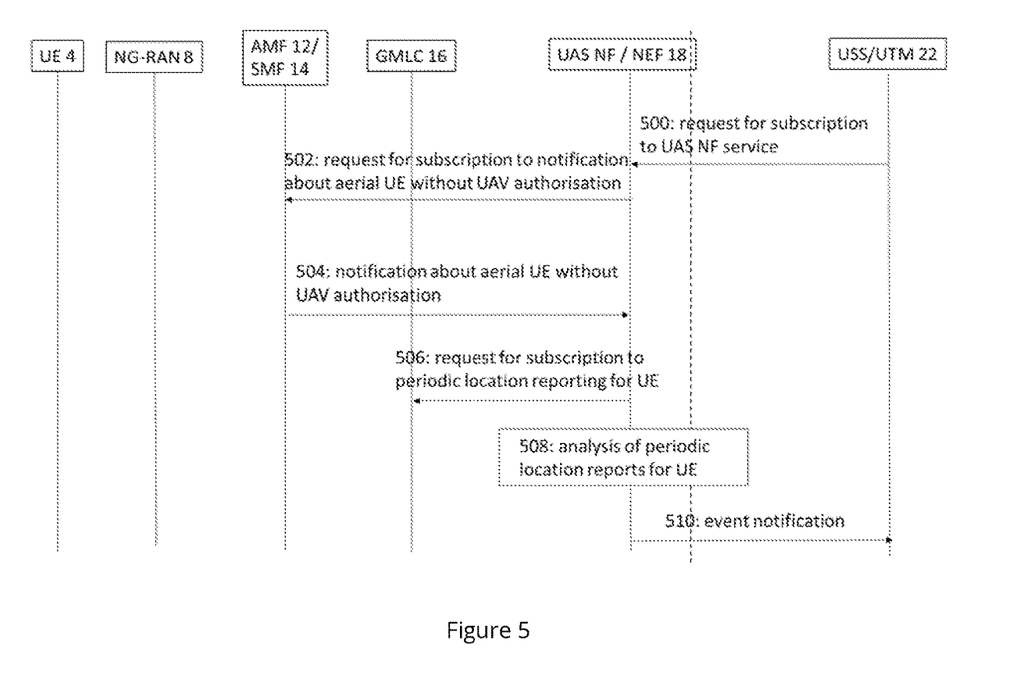
FIG. 5 shows a representation of another example of operations at components of FIG. 1 related to the operations of FIG. 2 according to example embodiments.

FIG. 5 shows another example of operations at components of FIG. 1 after OPERATION 210 of FIG. 2. In summary, AMF 12/SMF 14 has determined that UE 4 is associated with UAV (because UE has a 3GPP aerial subscription and/or because UE 4 has provided a CAA-level ID) but there is no indication at AMF 12/SMF 14 of UAV authorisation by USS/UTM 22 (because a request for UAV authorisation was made and failed, or because AMF 12/SMF 14 did not send a request for UAV authorisation to USS/UTM 22 e.g. either because the UE did not provide CAA Level ID or because the UE does not have aerial subscription).

In this example of FIG. 5, UAS NF/NEF 18 implements the logic for checking for flight of a UE 4 notified by AMF 12/SMF 14 as being a UE for which there is indication at AMF 12/SMF 14 of association with a UAV but for which there is no indication at AMF 12/SMF 14 of UAV authorisation by USS/UTM 22.

AMF 12/SMF 14 has received (OPERATION 502) from UAS NF/NEF 18 a request for subscription to a service providing notifications of UEs for which there is an indication at AMF 12/SMF 14 of association with a UAV but for which there is no indication at AMF 12/SMF 14 of UAV authorisation by USS/UTM 22. The sending of this subscription request from UAS NF/NEF 18 may be based on local operator policy for the 3GPP mobile communication system, or may be based on receiving at UAS NF/NEF 18 a subscription request from USS/UTM 22 (OPERATION 500).

AMF 12/SMF 14 sends to UAS NF/NEF 18 an event notification about a UE 4 for which there is an indication at AMF 12/SMF 14 of association with a UAV but for which there is no indication at AMF 12/SMF 14 of UAV authorisation by USS/UTM 22 (OPERATION 504). The event notification comprises: an ID identifying the event (Event ID="UE-registered-without-UAV-authorisation"); one or more 3GPP identifiers for the UE 4 (e.g. GPSI); and a CAA-level UAV ID if provided by UE 4.

In response to receiving the event notification from AMF 12/SMF 14, UAS NF/NEF 18 sends to GMLC 16 a request for subscription to a service providing periodic location reporting for UE 4 (OPERATION 506).

UAS NF/NEF 18 monitors the periodic location reports from GMLC 16 for UE 4 (OPERATION 508). The UAS NF/NEF 18 compares the location information received for UE 4 from GMLC 16 against information about the spatial conditions (terrain relief) of the geographical area including the location of UE, and pre-provisioned flight corridor information for the geographical area. In response to determining at UAS NF/NEF 18 that a result of this comparison indicates that UE 4 is in flight, UAS NF/NEF 18 sends an event notification to USS/UTM 22 (OPERATION 510). The event notification includes an event ID identifying the event (Event Id=Unauthorised UAV operation"); and one or more 3GPP identifiers for the UE 4 (e.g. GPSI). The event notification may also include a CAA-level UAV ID (if included in the event notification from AMF 12/SMF14 to UAS NF/NEF 18 (OPERATION 506).

For any of the examples of FIGS. 3 to 5 described above: in response to receiving the event notification (Event Id=Unauthorised UAV operation") at OPERATION 308 of FIG. 3, OPERATION 412 of FIG. 4, or OPERATION 510 of FIG. 5): USS/UTM 22 may send to UAS NF/NEF 18 a message indicating whether the 3GPP mobile communication system is to track the travel of the UE 4, and provide USS/UTM 22 with one or more reports about a change in the location of UE 4. In response to receiving a request for continued location reporting from USS/UTM 22, UAS NF 18 may send to AMF 12 and/or GMLC 16 a request for a new subscription to a service providing notifications about changes in location of UE 4. Alternatively, the 3GPP mobile communication system may be configured to report changes in the location of UE 4 to USS/UTM 22, even without any specific request from USS/UTM 22.

The above-described techniques facilitate the detection and monitoring of flights of unauthorised UAVs.

Figure 6:
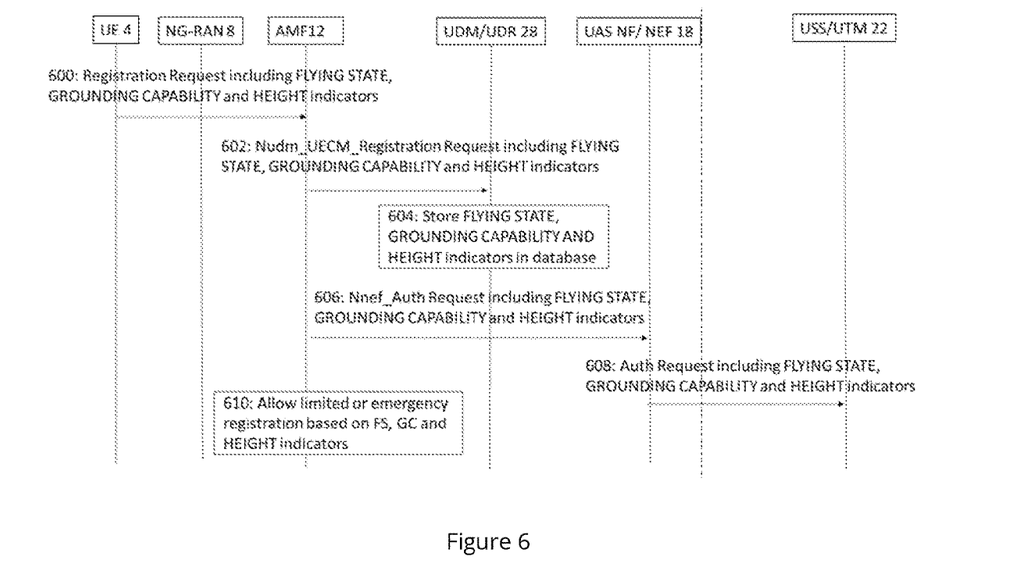
FIG. 6 shows a representation of another example of operations at the components of FIG. 1.

FIG. 6 illustrates an example of operations in the event that UE 4 (associated e.g. with UAV 2) does not meet one or more normal conditions imposed by a network for registration and/or the establishment of a PDU session. This example focusses on a situation in which UE 4 has 5G capability but only has a 4G (EPC) subscription; but the same technique applies to UEs which do not meet one or more other normal conditions for registration and/or PDU session establishment, such as conditions relating to roaming and radio access technology (RAT).

The UAV 2 flies under C2 operation by a remote UAV controller via a 3GPP mobile communication system into an area where only 5G signals are available. The operations of FIG. 6 provide for exceptional and limited 5G registration of the UE 4 (despite the absence of a 5G subscription) in order to better protect the UAV 2 and other UAVs operating in the same area.

For this, UE 4 may generate a registration request including additional indications or capabilities. The registration request sent by UE 4 to AMF 12 (OPERATION 600) may, for example, additionally include a FLYING_STATE indication indicating whether the UAV 2 is flying or is on the ground. The registration request sent by the UE 4 to AMF 12 may, for example if the UAV 2 is flying, additionally include a GROUNDING_CAPABILITY indication indicating whether or not the UAV 2 has a capability to land, e.g. in the event that registration is rejected; and the registration request may include a HEIGHT indication indicating height above ground level or altitude of the UAV 2.

AMF 12 passes these indications to UDM/UDR 28 (OPERATION 602), and UDM/UDR 28 stores this information in a database (OPERATION 604).

AMF 12 also passes these indications to UAS NF/NEF 18 (OPERATION 606); and UAS NF/NEF 16 forwards these indications to USS/UTM 22 (OPERATION 608). USS/UTM 22 may take this information into account when processing a request to authorise UAV 2.

In the event that authorisation of UAV 2 at USS/UTM 22 is NOT successful, AMF 12 may reject the registration request or AMF 12 may decide to (still) allow emergency registration or registration with limited capability, depending on the indications provided by UE 4 to the AMF 12 via the non-access stratum (NAS). For example, AMF 12 may decide to allow emergency or limited registration if the indications indicate that UAV 2 is flying without a possibility to land, and at a height at which UAVs are allowed to fly. The limited registration may, for example, only allow the UE 4 to use the 3GPP mobile communication system for services necessary for safe control of the UAV 2 by the remote UAV controller.

In the event that USS/UTM 22 rejects the request to authorise UAV 2, the indications provided by UE 4 are nevertheless useful for the 3GPP mobile communication system to determine if a UAV 2 is flying or not, and for the AMF 12 to generate a report of unauthorised flying UAVs.

Figure 7:
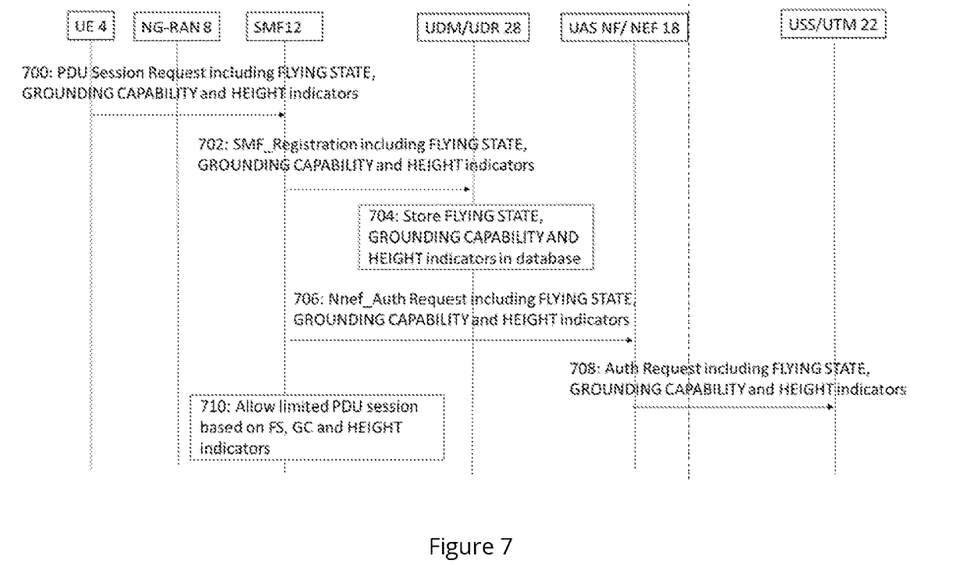
FIG. 7 shows a representation of another example of operations at the components of FIG. 1.

FIG. 7 illustrates another example of operations in the event that the UAV 2 flies under Command-to-Control (C2) operation by a remote UAV controller via a 3GPP mobile communication system into an area in which the UAV-UE does not meet one or more normal conditions for the establishment of a PDU session in the 3GPP mobile communication system available in the area. The operations of FIG. 7 provide for an exceptional and limited 5G data connection (PDU session) for the UE 4 in order to better protect the UAV 2 and other UAVs operating in the same area.

For this, UE 4 may generate a PDU session request including additional indications or capabilities. The PDU session request sent by UE 4 to SMF 14 (OPERATION 700) may, for example, additionally include a FLYING_STATE indication indicating whether the UAV 2 is flying or is on the ground. The PDU session request sent by the UE 4 to SMF may, for example if the UAV 2 is flying, additionally include a GROUNDING_CAPABILITY indication indicating whether or not the UAV 2 has a capability to land, e.g. in the event that the request for a PDU session is rejected; and the PDU session request may include a HEIGHT indication indicating height above ground level or altitude of the UAV 2.

SMF 14 passes these indications to UDM/UDR 28 (OPERATION 702), and UDM/UDR 28 stores this information in a database (OPERATION 704).

SMF 14 also passes these indications to UAS NF/NEF 18 (OPERATION 706); and UAS NF/NEF 18 forwards this information to USS/UTM 22 (OPERATION 708). USS/UTM 22 may take this information into account when processing a request to authorise UAV 2.

In the event that authorisation of UAV 2 at USS/UTM 22 is NOT successful, SMF 14 may reject the PDU session request or SMF 14 may decide to (still) grant a limited data connection to UE 4, depending on the indications provided by UE 4 to the SMF 14 in the PDU session request. For example, SMF12 may decide to grant a limited data connection if the indications indicate that UAV 2 is flying without a possibility to land, and at a height at which UAVs are allowed to fly. The limited data connection (PDU session) may, for example, be limited to services necessary for safe control of the UAV 2 by the remote UAV controller.

In the event that USS/UTM 22 rejects the request to authorise UAV 2, the indications provided by UE 4 are nevertheless useful for the 3GPP mobile communication system to determine if a UAV 2 is flying or not, and for the SMF 14 to generate a report of unauthorised flying UAVs.

Figure 8:
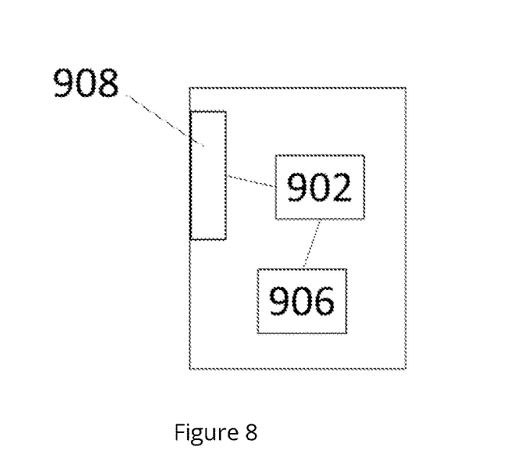
FIG. 8 shows a representation of an example of apparatus for implementing operations at a core network function of FIG. 1 according to example embodiments.

FIG. 8 illustrates an example of an apparatus for implementing a core network function such as AMF 12, SMF 14, DAF 20, UAS NF/NEF 18 or for implementing USS/UTM 22. The apparatus may comprise at least one processor 902 coupled to one or more interfaces 908 for communication with one or more other core network 10 nodes, RAN 8 or USS/UTM 22. The at least one processor 902 may also be coupled to at least one memory 906. The at least one processor 902 may be configured to execute an appropriate software code to perform the operations described above. The software code may be stored in the memory 906.

Figure 9:
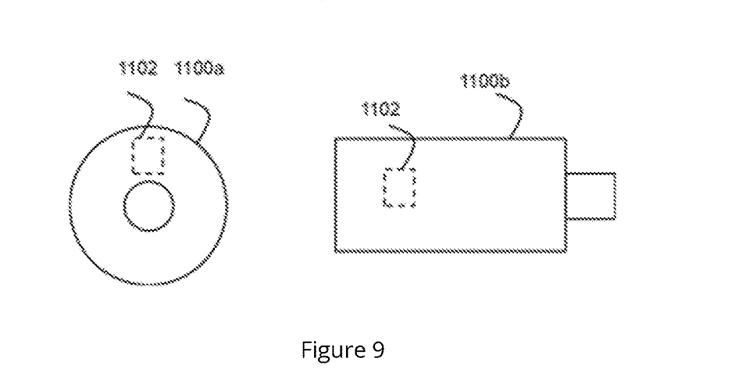
FIG. 9 shows a representation of an example of non-volatile memory media.

FIG. 9 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as the base stations or user equipment of the above-described embodiments.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as the user equipment or base stations of the above-described embodiments, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method comprising:
determining, by a network entity of a mobile communication system, that a user equipment (UE) is associated with an unmanned aerial vehicle (UAV) based on the UE having a 3GPP aerial subscription and the UE having provided a Civil Aviation Authority-level identity (CAA-level ID);
sending, by the network entity, to a traffic management entity of the mobile communication system, a request for authorization for the UE associated with the UAV to use the mobile communication system for communications between the UAV and a UAV controller of the UAV; and
based on receiving, by the network entity, from the traffic management entity, an indication of failure of the authorization of the UE associated with the UAV by the traffic management entity, sending, by the network entity, to a data analytics function of the mobile communication system, a subscription request for a subscription to a service of the data analytics function to provide, to the network entity, a notification whenever the data analytics function determines the UE associated with the UAV is flying, the subscription request including an identifier of the user equipment, the notification indicating that the UE associated with the UAV is flying.

2. The method according to claim 1, wherein the subscription request further includes location information indicative of a location the user equipment.

3. The method according to claim 2, wherein the location information comprises a latitude of the user equipment, a longitude of the user equipment, and an altitude of the user equipment.

4. The method according to claim 1, further comprising: in response to receiving the notification indicating the user equipment is flying, directing the notification indicating that the user equipment is flying to the traffic management entity.

5. The method of claim 1, wherein the network entity is an access and mobility function or a session management function.

6. The non-transitory computer readable medium according to claim 1, wherein the network entity is an access and mobility function or a session management function.

7. A method, comprising:
in response to (i) receiving, at a traffic management entity and from a core network node of a mobile communication system, a notification of registration of a user equipment to the mobile communication system, without (ii) receiving, at the traffic management entity, a request for authorization of an aerial vehicle associated with the user equipment: subscribing to a data analytics service of a data analytics function of the mobile communication system for one or more notifications about one or more events indicating flight of the user equipment.

8. The method according to claim 7, wherein the subscribing to the data analytics service comprises sending, by the traffic management entity, to the data analytics function, via a network exposure function of the mobile communication system, a request for subscribing to the data analytics service for one or more notifications about one or more events indicating flight of the user equipment.

9. An apparatus comprising:
at least one processor; and
at least one memory storing instructions of a network entity of a mobile communication system, wherein the instructions, when executed by the at least one processor, cause the apparatus at least to perform operations, the operations comprising:
determining, by a network entity of a mobile communication system, that a user equipment (UE) is associated with an unmanned aerial vehicle (UAV) based on the UE having a 3GPP aerial subscription and the UE having provided a Civil Aviation Authority-level identity (CAA-level ID);
sending, by the network entity, to a traffic management entity of the mobile communication system, a request for authorization for the UE associated with the UAV to use the mobile communication system for communications between the UAV and a UAV controller of the UAV; and
based on receiving, by the network entity, from the traffic management entity, an indication of failure of the authorization of the UE associated with the UAV by the traffic management entity, sending, by the network entity to a data analytics function of the mobile communication system, a subscription request for a subscription to a service of the data analytics function to provide, to the network entity, a notification whenever the data analytics function determines the UE associated with the UAV is flying, the subscription request including an identifier of the user equipment, the notification indicating that the UE associated with the UAV is flying.

10. The apparatus according to claim 9, wherein the subscription request further includes location information indicative of a location the user equipment.

11. The apparatus according to claim 10, wherein the location information comprises a latitude of the user equipment, a longitude of the user equipment, and an altitude of the user equipment.

12. The apparatus according to claim 9, wherein the operations further comprise: in response to receiving the notification indicating the user equipment is flying, directing, to the traffic management entity, the notification indicating the user equipment is flying.

13. The apparatus of claim 9, wherein the network entity is an access and mobility function or a session management function.

14. An apparatus comprising:
at least one processor; and
at least one memory storing instructions of a traffic management entity, when executed by the at least one processor, cause the apparatus at least to perform:
in response to (i) receiving from a core network node of a mobile communication system, a notification of registration of a user equipment to the mobile communication system, without (ii) receiving, at the traffic management entity, a request for authorization of an aerial vehicle associated with the user equipment: subscribing to a data analytics service of a data analytics function of the mobile communication system for one or more notifications about one or more events indicating flight of the user equipment.

15. The apparatus according to claim 14, wherein the subscribing comprises sending to the data analytics service via a network exposure function of the mobile communication system, a request for subscribing to the data analytics service for the one or more notifications about the one or more events indicating flight of the user equipment.

16. A non-transitory computer readable medium comprising instructions of a network entity of a mobile communication system stored thereon, wherein the instructions, when executed by at least one processor of an apparatus, cause the apparatus to perform operations, the operations comprising:
determining, by a network entity of a mobile communication system, that a user equipment (UE) is associated with an unmanned aerial vehicle (UAV) based on the UE having a 3GPP aerial subscription and the UE having provided a Civil Aviation Authority-level identity (CAA-level ID);
sending, by the network entity, to a traffic management entity of the mobile communication system, a request for authorization for the UE associated with the UAV to use the mobile communication system for communications between the UAV and a UAV controller of the UAV; and
based on receiving, by the network entity, from the traffic management entity, an indication of failure of the authorization of the UE associated with the UAV by the traffic management entity, sending, to a data analytics function of the mobile communication system, a subscription request for a subscription to a service of the data analytics function to provide, to the network entity, a notification whenever the data analytics function determines the UE associated with the UAV is flying, the subscription request including an identifier of the user equipment, the notification indicating that the UE associated with the UAV is flying.

17. The non-transitory computer readable medium according to claim 16, wherein the subscription request further includes location information indicative of a location the user equipment.

18. The non-transitory computer readable medium according to claim 17, wherein the location information comprises a latitude of the user equipment, a longitude of the user equipment, and an altitude of the user equipment.

19. The non-transitory computer readable medium according to claim 16, wherein the operations further comprise: in response to receiving the notification indicating the user equipment is flying, directing, to the traffic management entity, the notification indicating the user equipment is flying.

* * * * *